United States Patent [19]

Mitchell et al.

[11] Patent Number: 4,900,468

[45] Date of Patent: * Feb. 13, 1990

[54] STABILIZED LIQUID HYDROGEN PEROXIDE BLEACH COMPOSITIONS

[75] Inventors: James D. Mitchell; James P. Farr, both of Pleasanton, Calif.

[73] Assignee: The Clorox Company, Oakland, Calif.

[ * ] Notice: The portion of the term of this patent subsequent to Aug. 16, 2005 has been disclaimed.

[21] Appl. No.: 144,616

[22] Filed: Jan. 11, 1988

Related U.S. Application Data

[63] Continuation of Ser. No. 745,617, Jun. 17, 1985, abandoned.

[51] Int. Cl.[4] .................. C01B 15/037; C11D 7/54; D06L 3/02
[52] U.S. Cl. ............................... 252/95; 8/111; 252/186.28; 252/186.29; 252/400.21; 252/404; 423/272; 423/584
[58] Field of Search ............... 252/95, 99, 186.28, 252/186.29, 404, DIG. 11, DIG. 21; 423/272, 584; 8/111

[56] References Cited

U.S. PATENT DOCUMENTS

| | | | |
|---|---|---|---|
| 3,234,140 | 2/1966 | Irani | 252/186 |
| 3,393,153 | 7/1968 | Zimmerer et al. | 252/95 |
| 3,415,608 | 12/1968 | Tucker | 8/111 |
| 3,591,341 | 7/1971 | Reilly | 23/207.5 |
| 3,607,053 | 9/1971 | Reilly | 23/207.5 |
| 3,649,194 | 3/1972 | Glanville | 23/207.5 |
| 3,681,022 | 8/1972 | Kibbel | 23/207.5 |
| 3,801,512 | 4/1974 | Solenberger | 252/186 |
| 3,822,114 | 7/1974 | Montgomery | 8/111 |
| 3,864,271 | 2/1975 | Stalter | 252/99 |
| 3,869,401 | 3/1975 | Ernst | 252/186 |
| 3,956,159 | 5/1976 | Jones | 252/104 |
| 3,970,575 | 7/1976 | Barrett, Jr. | 252/95 |
| 3,996,152 | 12/1976 | Edwards et al. | 252/186 |
| 4,013,404 | 3/1977 | Parent | 8/423 |
| 4,022,703 | 5/1977 | Bakes et al. | 252/100 |
| 4,070,442 | 1/1978 | Watts | 423/272 |
| 4,079,015 | 3/1978 | Pancot et al. | 252/95 |
| 4,130,501 | 12/1978 | Lutz et al. | 252/95 |
| 4,133,869 | 1/1979 | Kim | 423/272 |
| 4,238,192 | 12/1980 | Kandathil | 8/111 |
| 4,239,643 | 12/1980 | Kowalski | 252/182 |
| 4,320,102 | 3/1982 | Dalton, Sr. et al. | 423/273 |
| 4,347,149 | 8/1982 | Smith et al. | 252/102 |
| 4,362,706 | 12/1982 | Willard | 423/273 |
| 4,430,236 | 2/1984 | Franks | 252/95 |
| 4,448,705 | 5/1984 | Gray | 252/102 |
| 4,470,919 | 9/1984 | Goffinet | 252/102 |
| 4,478,737 | 10/1984 | Adrian et al. | 252/186.25 |
| 4,497,725 | 2/1985 | Smith et al. | 8/111 |
| 4,510,068 | 4/1985 | Rohlfs et al. | 252/186.29 |
| 4,525,291 | 6/1985 | Smith et al. | 252/95 |
| 4,623,356 | 11/1986 | Hendrix et al. | 8/111 |
| 4,764,302 | 8/1988 | Baker et al. | 252/301.23 |
| 4,772,290 | 9/1988 | Mitchell et al. | 8/107 |

FOREIGN PATENT DOCUMENTS

| | | |
|---|---|---|
| 0076166 | 6/1983 | European Pat. Off. . |
| 124341 | 11/1984 | European Pat. Off. . |
| 137669 | 4/1985 | European Pat. Off. . |
| 2918842 | 12/1979 | Fed. Rep. of Germany . |
| 1598610 | 9/1981 | United Kingdom . |

OTHER PUBLICATIONS

Kirk-Othmer *Encyclopedia of Chemical Technology* vol. 3, John Wiley and Sons, 1978 pp. 128-142, 146-148.
Kirk-Othmer *Encyclopedia of Chemical Technology* vol. 19, John Wiley and Sons, 1982 pp. 805, 806, 825.
Encyclopedia of Chemical Technology, Kirk-Othmer, Third Edition, vol. 13 "Hydrogen-Ion Activity To Laminated Materials, Glass", pp. 14–15 Atlas Chemical Industries, Inc. Products Brochure, pp. 1–4.

*Primary Examiner*—Paul Lieberman
*Assistant Examiner*—Linda D. Skaling
*Attorney, Agent, or Firm*—Leonard Phillips; John A. Bucher; Joel J. Hayashida

[57] ABSTRACT

Aqueous peroxide bleaching compositions that include surfactant, fluorescent whiteners and dyes are effectively stabilized by the addition of a heavy metal chelating agent and a free radical scavenging agent. Both agents must be present to achieve maximum stability. Particularly preferred chelating agents are the amino polyphosphonates. Particularly preferred free radical scavenging agents are the hydroxybenzenes and especially substituted phenols. Not only is the peroxide oxidizing agent stabilized, but surfactant, fluorescent whitener, and dye as well.

11 Claims, No Drawings

STABILIZED LIQUID HYDROGEN PEROXIDE BLEACH COMPOSITIONS

This is a continuation of copending application Ser. No. 745,617 filed on June 17, 1985 now abandoned.

FIELD OF THE INVENTION

This invention relates to household fabric bleaching compositions, but more particularly to liquid peroxide, e.g., hydrogen peroxide based bleaching compositions including additional adjuncts such as surface active agents, fluorescent whiteners, and dyes. The bleaching compositions have the peroxide and certain adjuncts therein stabilized by the addition of agents to chelate heavy metal cations and scavenge free radicals.

BACKGROUND OF THE INVENTION

Liquid bleaches have been used in households for at least 50-75 years as aids in the bleaching and cleaning of fabrics. Hypochlorite bleaches have been used most extensively for this purpose since they are highly effective, inexpensive and simple to produce.

In an attempt to broaden and extend the utility of bleaches for household use, other bleach systems have been introduced in recent years. Prominent among these are dry powdered or granular compositions, most usually based upon peroxy-compositions; or upon per-boro-compositions. Such materials must be placed into aqueous solution to release the bleaching action.

Liquid bleaching compositions utilizing peroxy compounds have generally been utilized less in the household market than the solid forms referred to above. Although hydrogen peroxide compositions effectively bleach a broad range of fabric materials; and do not release objectional gases or odors; they have not found as much use in the household market as hypochlorite bleaches. This lack of use in the household market has been partially attributable to the instability of peroxide solutions. This instability is mediated principally by metal ion contamination even in extremely low concentrations. Considerable effort has been expended in the search for stabilizing agents for hydrogen peroxide compositions.

Perhaps one reason why stabilized hydrogen peroxide compositions have not been successful is the fact that it is very desirable to add other organic components to commercial bleaching compositions, especially where the compositions are intended to be used as "pre-spotters". Such "pre-spotter" compositions most advantageously include surfactants for their detergent effect; fluorescent whiteners (also known as optical brighteners) to increase fabric reflectance and the user's perception of increased whiteness; and dyes for producing a pleasing color to the bleach solutions. All of the above components, in addition to the bleach compounds themselves have been found to be necessary in a liquid peroxygen bleaching composition to achieve full acceptance in the household market.

Unfortunately liquid bleaching compositions based upon peroxide but only deteriorate from the presence of contaminants, e.g., trace metal cations (0.5 ppm or greater); but the surfactant, fluorescent whiteners, and dyes are attacked by the peroxide itself, as it is a powerful oxidizing agent. Thus peroxide based bleaching compositions including surfactants, fluorescent whiteners, and dyes deteriorate quite rapidly. The surfactants are oxidized and lose their detergency; the fluorescent whiteners are oxidized and lose their effect; and the dyes are oxidized and lose their color, or are changed to undesirable colors.

BRIEF DESCRIPTION OF THE INVENTION

The present invention is directed to methods for stabilizing liquid hydrogen peroxide based compositions, and more especially to stabilizing liquid peroxide bleaching compositions that also include surfactants, fluorescent whiteners, and dyes. The invention is also directed to compositions produced by such methods.

More particularly the present invention relates to liquid hydrogen peroxide bleaching compositions (including the aforementioned additional components) that are stabilized by the addition of a metal chelating agent as well as a free radical scavenging agent thereto. The presence of both the chelating agent and free radical scavenging agent are necessary to achieve the desired stability.

The metal chelating or sequestering agent may be selected from among the known metal chelating agents. A preferred group of such chelating agents are the amino polyphosphates which are known to sequester metal ions such as $Fe^{+++}$ and $Cu^{++}$.

The free radical scavenging agent may be selected from organic antioxidants, especially the substituted mono- and di-hydroxybenzenes and their analogs.

Stabilization of hydrogen peroxide compositions including the associated fluorescent whiteners (also known as optical brighteners), surfactant, and dye components relies upon the presence of both the metal chelating agent and the free radical scavenging agent. The stabilizing agents need only be present in very small amounts, e.g., tenths to hundredths of a percent by weight of the liquid composition, in order to effectively prevent deterioration and retention of the desired strengths of the various components over extended periods of time.

As utilized herein, "stabilization" refers to the retention of physical and chemical properties at, or somewhat below their initial levels by each of the liquid bleach composition components for extended periods of time; and a significant reduction in the rate of deterioration of such components in comparison to unstabilized formulations. Thus, in the presence of the stabilizing agents, the peroxide component retains most of its initial oxidation potential; the surfactant component retains most of its detergency; the fluorescent whitener retains most of its ability to impart improved appearance to fabrics; and the dye component is prevented from completely oxidizing.

It is therefore an object of the invention to provide a method for stabilizing the components in a liquid peroxide bleaching composition wherein said components include a peroxide oxidant, a surfactant, fluorescent whitener, and dye.

It is another object of the invention to provide a stabilizing system comprising a metal chelating agent and a free radical scavenger which arrests decomposition of organic components, such as surfactants, dyes and whiteners contained within a liquid peroxide bleaching composition.

It is another object of the invention to stabilize liquid peroxide bleach compositions by including a metal chelating agent and a free radical scavenging agent therein.

It is still another object of the invention to provide stable liquid hydrogen peroxide bleach compositions.

It is still another object of the invention to stabilize liquid peroxide bleach compositions by incorporating therein small amounts of a metal chelating agent such as an amino polyphosphonate and a free radical scavening agent such as a substituted hydroxybenzene.

It is yet another object of the invention to stabilize liquid peroxide bleaching compositions by including therein an agent to sequester metal ions and an agent to scavenge free radicals formed in said liquid composition.

Other objects and advantages of the invention will become apparent from a review of the following specification and the claims appended hereto.

DETAILED DESCRIPTION OF THE INVENTION

Liquid hydrogen peroxide based household bleaching compositions are stabilized by the addition of small amounts of a two component system, i.e., a metal chelating or sequestering agent and a free radical scavenging agent.

The liquid bleach compositions comprise a hydrogen peroxide bleaching component, with the addition of at least one surfactant, fluorescent whiteners, dye, and a fragrance if desired, and suitable amounts of an acid or base to maintain the final solution pH in the range of 1–8, more usually 1–6, and most preferably 2–4. Small amounts of the stabilizing agents, and, of course, water complete the bleach compositions.

The peroxide component may be fairly dilute. In one preferred embodiment hydrogen peroxide is present at about 3.5% by weight. The surfactant is present at levels of about 3–4% by weight. The whiteners are present at levels of about 0.15–0.6% by weight. The dye may comprise about 0.0005% by weight of the composition. Small amounts of fragrance oil e.g., 0.01% by weight may also be present. The stabilizing agents may comprise about 0.1–0.2% by weight in the case of the chelating agent, and about 0.01–0.03% by weight in the case of the free radical scavenging agent.

Sufficient buffer is added to maintain the product pH at about 1–8. Water usually comprises the remaining percentage of the solution. The water should be deionized to reduce metal ion contaminants to as low a level as possible. It should be noted, however, that even if metal ion contamination reaches levels of 2–10 ppm or more, the stabilizing system of the invention is still effective.

As will be noted hereinafter, the stabilizing agents appear to have a synergistic effect upon the stability of the bleach compositions. Both the chelating agent and the free radical scavenger must be present in order to fully stabilize the compositions.

The reason for the stabilization effect is not fully understood. However, without wishing to be bound thereby, it is theorized that in the presence of hydrogen peroxide, organic compounds such as nonionic surfactants, e.g., ethoxylated alcohols, and fluorescent whiteners, e.g., stilbenes and distyrylbiphenyls, a reaction occurs with the peroxide and/or its decomposition species to produce free radicals. Once the free radicals are produced they are able to react further with the organic components to continually degrade the composition.

More specifically, in aqueous solution, free radical reactions can be initiated with peroxides, which act to abstract a hydrogen ion from, for instance, one of the ethylene groups present on the nonionic surfactant molecules. Such reaction might be viewed as follows:

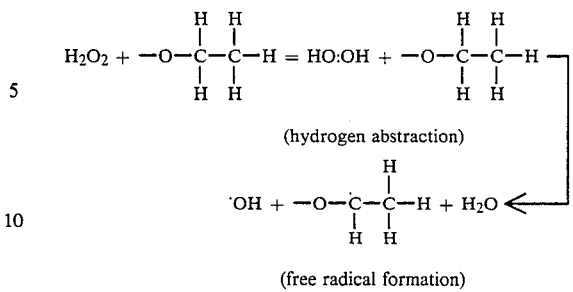

(hydrogen abstraction)

(free radical formation)

Alternately, the hydrogen peroxide itself may form free radicals by homolytic cleavage of either an O—H bond or the O—O bond. That is:

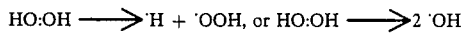

In any event, there are a number of mechanisms by which free radicals can occur in the peroxide-organic composition. By a little understood mechanism it appears that the presence of heavy metal chains also promote the generation of free radicals. Such free radical reactions are self-propagating and become a chain reaction until a termination product is produced. By such time, in the absence of any stabilization means, both the peroxide and the organic components are, in large measure, destroyed.

Once formed, any such free radicals are free to combine with other organic species in the solution, e.g., the optical brighteners and dye. Such free radicals would be especially reactive with compounds having conjugated double bonds, e.g., dyes and brighteners.

In the stabilizing system of the invention, the chelating agent appears to act to sequester the heavy metal cations, especially polyvalent metals such as copper and iron which are always present in small amounts among the mineral components in water. Thus the heavy metal cations' ability to catalyse peroxide homolysis is interfered with. Similarly the heavy metals' ability to mediate free radical generation is eliminated or greatly reduced.

The free radical scavenging agent appears to work by tying up any free radicals initially formed in the solution. Thus the ability of the free radicals to degrade the organic components is removed at the same time the self-propagating free radical cascade reactions are stopped short. By such a mechanism, destruction of the desired surfactant, optical whitener, dye, and perfume components is arrested or greatly reduced.

It should be understood that the foregoing is presented as a possible explanation for the surprising stability imparted to peroxide bleaching compositions; but the inventors do not thereby intend to be bound by such explanation. Other plausible reactions may be responsible for the improvement in stability.

Yet the individual functions of the chelating agent and the free radical scavenger do not explain why such surprising improved stability is achieved by the present invention. When the two component stabilizing system is used in liquid peroxide bleach compositions, decomposition of the organic components therein is dramatically decreased, even over the stabilizing abilities of the chelating agent and the free radical scavenger considered individually. Therefore the combination of the chelating agent and the free radical scavenger appears to possess synergistic action in improving stability of liquid peroxide compositions containing organic components.

Referring to the stabilized peroxide compositions of the invention, a peroxide source is present as the principal active ingredient and functions as the bleaching agent. The peroxide is normally present as hydrogen peroxide and is present in the range of about 0.05-50 weight %, most usually at about 0.1-35 wt.%, and most preferred at 0.5-15 wt.%. The hydrogen peroxide is a staple article of commerce available from a number of commercial sources. In making up the bleaching compositions, ordinarily the peroxide is purchased as a concentrated aqueous solution, e.g., 70%, and diluted with deionized water to the desired strength. The FMC Corp. of Philadelphia, Pa. is one source of hydrogen peroxide.

Surfactants are desirable for use in the bleaching compositions. Not only do they perform the normal soil removing function; but, in the present formulations, they also assist in emulsifying the free radical scavenger into the aqueous bleach formulation. As will be noted hereinafter, the free radical scavenger component is somewhat hydrophobic. The surfactant therefore assist mixing of free radical scavenger into the bleach compositions.

As will be noted hereinafter, the surfactant component can provide a thickening effect; especially when used in higher concentrations, such as when exceeding about 5 wt.%.

The most preferred surfactants are nonionics. Suitable nonionics include polyethoxylated alcohols, ethoxylated alkyl phenols, polyoxyethylene or polyoxypropylene block co-polymers, anhydrosorbitol esters, alkoxylated anhydrosorbitol esters, and the like. Other potentially suitable surfactants are disclosed in the Kirk-Othmer Encyclopedia of Chemical Technology, 3rd Edition, Volume 22, pp. 360-377 (1983), the disclosure of which is incorporated herein by reference. Such nonionic surfactants may be obtained from any number of commercial sources. One such source for polyethoxylated alcohols is the Shell Chemical Co. of Houston, Tex. and are known under the tradename "Neodol". One suitable surfactant is "Neodol 25-7". This Neodol is an ethoxylated alcohol, wherein the alcohol has from 12-15 carbons to which 7 ethoxy groups are attached. Anhydrosorbitol esters (including sorbitan esters) are available from Atlas Chemical Industries under the tradenames "Tween" and "Arlacel".

The surfactant may be present in the compositions in about 3-4 weight %, although this level is not critical. Lower, or higher surfactant concentrations are acceptable within the ranges noted. The preferred range for surfactant is 0-50 wt.%; the more preferred range is 0-20 wt.%; and the most preferred range is 0-10 wt.%. At higher levels, and, as noted above, the surfactants may beneficially have a thickening effect on the liquid compositions. Such thickening would aid in the dispersion of particulate components such as dyes and whiteners. Also, as noted above, the surfactants may also assist in emulsifying the liquid compositions and aid in the suspension of some of the free radical scavengers since they tend to be somewhat insoluble in aqueous medium. Mixtures of the surfactants are also suitable.

Fluorescent whiteners (also referred to as optical brighteners, or FWA's) are also included in the bleaching formulations. Such whiteners are also common commercial products. Such products are fluorescent materials, very often substituted stilbenes and biphenyls, having the ability to fluoresce, by absorbing ultraviolet wavelengths of light, and then emitting visible light, generally in the blue wavelength ranges. The whiteners settle out or deposit onto the fabrics during the bleaching or washing process to thereby impart the desired whiteness. The whiteners may be present in the bleaching compositions in the order of several hundredths to about 5 wt.%, more preferably 0-1 wt.%, and most preferably 0-0.6 wt.%. One source of such whiteners is the Ciba Geigy Corp. of Greensboro, N.C., under the tradename "Tinopal". Other useful whiteners are disclosed in U.S. Pat. No. 3,393,153 to Zimmerer et. al., at columns 3-5, which disclosure is incorporated herein by reference.

Several different whiteners may be combined in the compositions. Such selection is governed by the fact that certain whiteners have affinity for cellulose fibers, e.g., cotton; while others have affinity for synthetic fibers, e.g., nylon. Since the bleaching compositions of the invention are intended for all types of fabrics, both natural and synthetic, it is advantageous to include whiteners of both types. One stilbene based product, "Tinopal RBS" has affinity for synthetic fibers. A distyrylbiphenyl product "Tinopal CBS-X" has affinity for cellulose fibers.

Small amounts of dye are also included in the preferred bleaching compositions. While the dye is only a very small percentage (perhaps 0.0005) of the compositions, it plays an important part in consumer's acceptance of the product. It is preferred that such dye be present in the range of 0-1 wt.%, more preferably 0-0.1 wt.%, and most preferably 0-0.001 wt.%. Dyes such as the anthraquinones are particularly suitable. Such anthraquinone dyes are available from the Sandoz Co. of Charlotte, N.C. One suitable dye is "Nylosan 2AL" from the aforementioned company. Other dyes of the desired color with resistance to bleaching can also be used. In some instances, inorganic pigments may be used. Such preferred pigments are those which have the metallic cations substantially or completely complexed, e.g., copper phthalocyanines.

A fragrance may also be used in the bleaching formulations, if desired. Any fragrance oil may be used, ordinarily in small quantities, e.g., 0.01%, so long as it is as stable as the other components. The preferred range is 0-5 wt.%. The more preferred range is 0-1 wt.%; while the most preferred range is 0-0.1 wt.%.

In addition to the aforementioned components, buffer is added to the composition in order to adjust the final pH into the 1-8 range, more preferably 1-6, and most preferably 2-4. Phosphoric acid is preferred for this purpose when acidic pH is desired. pH can be adjusted by proper amounts of acid or base.

As noted above, the stabilizing system is vital to the bleaching compositions. Both the chelating agent and the free radical scavenger must be present. Tests have shown that neither agent is as effective individually as when present in combination. Synergistic forces are obviously involved in the stabilization, and prolonged stability of the bleaching compositions results only when both agents are present.

The chelating agent may be selected from any number of known agents with the caveat that any agent selected must be effective in chelating heavy metal cations, such as $Cu^{++}$ and $Fe^{+++}$. The chelating agent should also be resistant to hydrolysis; and not easily oxidized by hydrogen peroxide. Preferably it should have an acid dissociation constant, i.e., $pK_a$ of about 1-9, indicating that it dissociates a low pH's to permit bonding to the metal cations.

In this regard, the amino polyphosphonates have been found to be most useful in the present bleaching compositions. The amino polyphosphonates are commercially available compounds sold under the trademark "Dequest" by the Monsanto Co. of St. Louis, Mo. These compounds have structures such as:

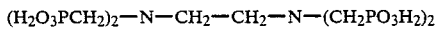

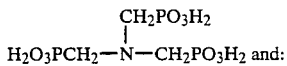

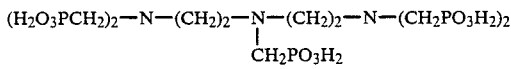

Such "Dequest" compounds are extremely effective as chelating agents in the bleach compositions.

Other related chelating agents such as the pyrophosphates may also be utilized.

The selected chelating agent should be present in the compositions in an amount sufficient to thoroughly tie up any heavy metal cations present in the aqueous solution. One or two tenths of a percent is sufficient. The chelating agent may be present in the range of 0.02-5 wt.%. The more preferred range is 0.04-0.3 wt.%. The most preferred range is 0.06-0.12 wt.%.

The second vital stabilizing agent is the free radical scavenger. For this purpose, the substituted phenols, or more broadly, hydroxybenzenes are preferred. Of this class of compounds butylated hydroxy toluene (BHT) and mono-tert-butyl hydroquinone (MTBHQ) have been found to be especially effective.

The free radical scavengers must resist oxidation by $H_2O_2$ and therefore, cannot be too strong a reducing agent. Strong reducing agents would more likely react with the peroxide.

Finally it is desirable that the free radical scavenging hydroxybenzenes be partially hindered, i.e., have a substituent alkyl or similar group attached to some of the reactive sites on the ring structure. If too many reactive sites are left unblocked, it may be possible to react with more than one available free radical and polymerize, thus causing phase separation. Any such phase separation is undesirable and would remove free radical scavenging agent from the bleach solution.

The aforementioned BHT and MTBHQ satisfy all the above criteria and are therefore preferred as the free radical scavenging agent. BHT is commercially available from the Uniroyal Chemical Co. while MTBHQ is commercially available from the Eastman Chemical Co. of Kingsport, Tenn.

Only very small amounts of the free radical scavenger are necessary in the bleach compositions. Generally, one to several hundredths of a percent provides effective free radical scavenging. The preferred range is 0.005-0.04 wt.%. The more preferred range is 0.007-0.03 wt.%; however the most preferred range is 0.01-0.02 wt.%.

As an example, a typical stabilized bleach formulation is set forth below:

PREFERRED STABILIZED BLEACHING FORMULATIONS

| PREFERRED STABILIZED BLEACHING FORMULATIONS | |
|---|---|
| Component | Wt. % |
| Nonionic surfactant (Neodol) | 2-4 |
| Fluorescent whitener - distyrylbiphenyl | 0.1-0.7 |
| - stillbene | 0.01-0.3 |
| Blue dye - anthroquinone | 0.0002-0.001 |
| Fragrance | 0.01 |
| $H_2O_2$ | 3-7 |
| Phosphonate chelating agent | 0.06-0.25 |
| Free radical scavenger | 0.005-0.02 |
| Phosphoric acid | sufficient to adjust pH to 2.3 |
| $H_2O$ - deionized | remainder |

A number of tests were performed to ascertain the effectiveness of the stabilizing system of the present invention. Several samples of hydrogen peroxide bleach compositions were prepared having variations in components and percentages thereof.

One formulation had the composition:

| FORMULATION A | |
|---|---|
| $H_2O_2$ | 3.5 wt. % |
| Whitener (distyrylbiphenyl) | 0.1 |
| Acid blue dye | 0.0005 |
| Surfactant ($C_{12-15}$ ethoxylated alcohol) | 3.5 |
| Free radical scavenger (MTBHQ) | 0.03 |
| Chelating agent (phosphonate) | 0.10 |
| Buffer (phosphoric acid) | 0.025 |
| $H_2O$ | Balance |

Another formulation had the composition:

| FORMULATION B | |
|---|---|
| $H_2O_2$ | 3.5 wt. % |
| Whitener - (naphthotriazolylstilbene) | 0.02 |
| (distyrylbiphenyl) | 0.15 |
| Fragrance oil | 0.01 |
| Acid blue dye | 0.0005 |
| Surfactant ($C_{12-15}$ ethoxylated alcohol) | 3.5 |
| Free radical scavenger (BHT) | 0.01 |
| Chelating agent (phosphonate) | 0.12 |
| Buffer (phosphoric acid) | 0.1 |
| $H_2O$ | Balance |

Another formulation had the composition:

| FORMULATION C | |
|---|---|
| $H_2O_2$ | 3.5 wt. % |
| Whitener - (napthotriazolylstilbene) | 0.03 |
| - (distyrylbiphenyl) | 0.5 |
| Fragrance oil | 0.01 |
| Acid blue dye | 0.0005 |
| Surfactant ($C_{12-15}$ ethoxylated alcohol) | 3.5 |
| Free radical scavenger (BHT) | 0.01 |
| Chelating agent (phosphonate) | 0.12 |
| Buffer (phosphoric acid) | 0.1 |

-continued

| FORMULATION C | |
|---|---|
| H$_2$O | Balance |

In some tests the formulations were left unstabilized, i.e., the identical compositions as set forth above but no chelating agent or free radical scavenger; or only the chelating agent was included; or only the free radical scavenger was included.

To ensure that contaminants customarily causing peroxide deterioration were present, a source of both ferric cation and cupric cation were added to the samples. The various samples were then subjected to aging tests at elevated temperatures for various time periods, and each sample was then tested for the percentage of H$_2$O$_2$, dye, or whitener remaining as compared to the original amount present in the compositions.

Tables 1 and 2 below present the results of aging tests for 3 hours at 100° C. and 4 weeks at 100° F. and 120° F., respectively.

TABLE 1

FORMULATION A
2.4 ppm Fe$^{+3}$ and 1.0 ppm of Cu$^{+2}$ added to all samples aged 3 hrs. at 100° C.

| | Unstabilized Bleach Formulation (% remaining) | + chelating agent (Dequest) (% remaining) | + free radical scavenger (MTBHQ) (% remaining) | + Both stabilizing agents (Dequest + MTBHQ) (% remaining) |
|---|---|---|---|---|
| Dye | 0 | 24 | 0 | 51 |
| Whitener | 32 | 58 | 41 | 77 |

TABLE 2

FORMULATION B
4 Week Storage Stability Test

| | 120° F. | | 100° F. | |
|---|---|---|---|---|
| | Bleach Formulation (unstabilized) (% remaining) | + Dequest + BHT +1 ppm Fe$^{+3}$ + 1 ppm Cu$^{+2}$ (% remaining) | Bleach Formulation (Unstabilized) (% remaining) | + Dequest + +1 ppm Fe$^{+3}$ + 1 ppm Cu$^{+2}$ (% remaining) |
| H$_2$O$_2$ | 91 | 99 | 96 | 99 |
| Whitener | 28 | 93 | 68 | 100 |
| Dye | 43 | 80 | 72 | 98 |

In another study, similar aging tests were conducted for a period of eight weeks at storage temperatures of 70° F., 100° F., and 120° F. Table 3 below presents the results of these longer aging tests.

TABLE 3

FORMULATION B
8 Week Stability Test[1]

| Storage Temp. | 70° F. | | 100° F. | | 120° F. | |
|---|---|---|---|---|---|---|
| Component | S[2] | Uns.[3] | S[2] | Uns.[3] | S[2] | Uns.[3] |
| H$_2$O$_2$ | 100 | 92.3 | 97 | 77 | 96 | 56 |
| Whitener | 100 | 57 | 94 | 13 | 56 | 10 |
| Dye | 96.8 | 51 | 83 | 0 | 55 | 0 |

[1]The numbers shown represent the % of the component remaining at the end of the test period.
[2]"S" indicates stabilized composition
[3]"Uns" indicates unstabilized composition In some further tests, stabilized samples of Formulation B and C above were aged at various temperatures in order to follow the deterioration of the various components with time. Catalyzing metal cations (5 ppm) were added to the stabilized formulations. The results are set forth in Tables 4 and 5 below:

TABLE 4

FORMULATION C
8 Week Stability Test

| Storage Temp. Component[1] | 100° F. | 120° F. |
|---|---|---|
| H$_2$O$_2$ | 96 | 95 |
| Whitener | 97 | 74 |
| Dye | 77 | 48 |

[1]The numbers shown represent the % of the component remaining at end of test period.

TABLE 5

FORMULATION B
8 Week Stability Test

| Storage Temp. Component[1] | 100° F. |
|---|---|
| H$_2$O$_2$ | 98 |
| Whitener | 87 |
| Dye | 77 |

[1]The numbers shown represent the % of the component remaining at end of test period.

A review of the data present in Tables 1, 2, 3, 4, and 5 reveals that when the peroxide compositions were stabilized with both the chelating agent and free radical scavenger, significantly more H$_2$O$_2$, whitener, and dye remained at all aging temperatures as compared with unstabilized composition.

It should be noted from Table 1 that the addition of the chelating agent alone, or the free radical scavenger alone, did not stabilize the compositions nearly as well as did the addition of both chelating agent and free radical scavenger. These data clearly indicate that both the chelating agent and the free radical scavenger must be present in order to optimize the composition's stability.

Another test was conducted on a simplified peroxide formulation omitting surfactant and whiteners. It was intended to ascertain whether the presence of surfactant was necessary to achieve good stability. The formulation was:

| FORMULATION D | |
| --- | --- |
| $H_2O_2$ | 3.5 wt. % |
| Acid blue dye | 0.0005 |
| Free radical scavenger (MTBHQ) | 0.01 |
| Chelating agent (phosphonate) | 0.12 |
| Buffer (phosphoric acid) | 0.1 |
| $H_2O$ | Balnce |

Formulation D above, along with an identical formulation that omitted the free radical scavenger and the chelating agent were boiled for three hours and the samples were analysed for deterioration of the dye as a measure of formulation stability. Table 6 below sets forth the results:

TABLE 6

| | FORMULATION D 3 Hours at 100° C. | |
| --- | --- | --- |
| Component | Unstabilized | Stabilized |
| Dye | 78%* | 98%* |

*Indicates percentage of original component remaining at end of test.

The results indicate that the formulation is stabilized even in the absence of surfactant.

What is claimed is:

1. A stabilized liquid peroxide bleaching composition comprising a liquid hydrogen peroxygen component, an organic component selected from fluorescent whiteners, dyes and mixtures thereof, and a stabilizing system comprising 0.02–5.0 wt.% of an amino polyphosphonate as a chelating agent selected for chelating polyvalent heavy metal cations and an effective amount of a partially hindered substituted hydroxybenzene as a free radical scavenging agent, said stabilizing system synergistically increasing stability of said organic component while allowing the peroxygen component to retain most of its initial oxidation potential.

2. The composition of claim 1 further including a fragrance.

3. The composition of claim 1 further comprising a nonionic surfactant selected from the group consisting essentially of polyethoxylated alcohol, ethoxylated alkyl phenols, polyoxypropylene or polyoxyethylene block copolymers, and mixtures thereof.

4. The composition of claim 1 wherein the substituted hydroxybenzene is a substituted hydroquinone.

5. The composition of claim 1 wherein the scavenging agent is butyl hydroxytoluene.

6. The composition of claim 4 wherein the substituted hydroquinone is mono-tert-butyl hydroquinone.

7. The composition of claim 1 wherein the peroxygen component is present in about 0.05–50 percent by weight.

8. The composition of claim 1 further including a buffer to maintain a pH of about 1–8.

9. The composition of claim 1 wherein the fluorescent whiteners are selected from fluorescent derivatives of stilbene and distyrylbiphenyls, and mixtures thereof.

10. A method for stabilizing aqueous bleach formulations including hydrogen peroxide and an organic component selected from fluorescent whiteners, dyes and mixtures thereof, comprising admixing into said formulations a stabilizing system comprising 0.02–5.0 wt.% of an amino polyphosphonate as a chelating agent selected for chelating polyvalent heavy metal cations and an effective amount of a partially hindered substituted hydroxybenzene as a free radical scavenging agent, said stabilizing system synergistically increasing stability of said organic component while allowing the hydrogen peroxide to retain most of its initial oxidation potential.

11. The method of claim 10 wherein said partially hindered free radical scavenging agent is mono-tert-butyl hydroquinone or butyl hydroxytoluene.

* * * * *